United States Patent [19]

Soucy et al.

[11] 4,393,954
[45] Jul. 19, 1983

[54] MOTORIZED BICYCLE

[76] Inventors: Paul B. Soucy; John J. Soucy, both of 119 West St., Methuen, Mass. 01844

[21] Appl. No.: 255,156

[22] Filed: Apr. 17, 1981

[51] Int. Cl.³ .............................................. B62K 11/00
[52] U.S. Cl. .................................... 180/205; 74/594.1
[58] Field of Search ....................... 180/205, 206, 207; 280/291; 74/594.1, 594.2, 594.3, 594.7

[56] References Cited

U.S. PATENT DOCUMENTS

| 682,682 | 9/1901 | Hafelfinger | 180/205 X |
| 1,097,546 | 5/1914 | Harley | 180/207 |
| 2,457,430 | 12/1948 | Argyris | 180/207 |

FOREIGN PATENT DOCUMENTS

| 553927 | 6/1923 | France | 180/207 |
| 1009807 | 6/1952 | France | 180/207 |
| 1239398 | 7/1960 | France | 280/291 |
| 381310 | 10/1932 | United Kingdom | 180/205 |

Primary Examiner—John A. Pekar
Attorney, Agent, or Firm—Edward A. Gordon

[57] ABSTRACT

In combination with a bicycle having a pedal crank shaft housing, a pedal crank shaft journaled in said housing, a frame having a front diagonal bar, an upwardly extending bar forming a seat support, a rearwardly extending fork, a forwardly extending fork, a wheel carried by said forward fork, a rear wheel carried by said rear fork and a sprocket assembly on the rear wheel, an auxiliary motor unit attachment comprising, a motor have a power output member, a power input member mounted on pedal crank shaft on one side of pedal crank shaft housing for transmitting power output from motor to the pedal crank shaft, a sprocket assembly mounted on the pedal crank shaft on the other side of the pedal crank shaft housing, a chain connecting the sprocket assembly with the rear wheel sprocket assembly, and left and right pedal cranks extending from the ends of the pedal crank shaft, for engaging the pedal crank shaft to impart its movement to the shaft and to disengage the shaft when power is transmitted from the power output member to the power input member.

5 Claims, 6 Drawing Figures

4,393,954

MOTORIZED BICYCLE

FIELD OF THE INVENTION

This invention relates to bicycles and more particularly to improvements in providing auxiliary motor power to any normal bicycle having one or more speed gears while retaining the pedal mode of operation.

BACKGROUND OF THE INVENTION

It is desirable to provide an improved economical means of motorizing any normal bicycle with a minimum of modification while at the same time employing the compact internal combustion engines which are available in the market. Additionally, it is also desirable to provide auxiliary motor power to normal bicycles having one or more speed gears such as the well known ten speed gear bicycle without modification of the speed gears while retaining the advantage of the speed gear changes whether operating in the engine power mode or pedal power mode.

BRIEF SUMMARY OF THE INVENTION

The desired objects of the invention are achieved by attaching an auxiliary motor unit to a normal bicycle such as for example a ten gear speed bicycle by supporting the motor on a brace attached between the front diagonal bar and the upwardly extending bar forming the seat support. The motor can be a conventional internal combustion engine such as a two or four stroke type. The power output of the engine is advantageously transmitted to the pedal crank shaft through a power transmission arrangement with the pedal crank shaft and which together with the pedal crank arrangement permit the bicycle to be readily operated in the engine power mode or pedal power mode while employing existing speed gears in either mode. In the present invention, an auxiliary motor unit attachment comprising an internal combustion engine having a power output means is attached by a supporting brace to the bicycle fram between the upwardly extending bar and the diagonally extending bar forming the seat support. A power input assembly is mounted on the pedal crank shaft on one side of the pedal crank shaft housing for transmitting power output from said engine to the pedal crank shaft. The power input assembly comprises an inner disk member which engages the pedal crank shaft to impart its movement to the shaft and disengages the pedal crank shaft when not imparting movement during the pedal power mode. An outer member of the assembly is coaxially disposed about the inner member and is adapted to receive power transmitted from the engine power output. Spring tension members are provided for connecting the outer disk member with the inner disk member for imparting power from the outer disk to the inner disk, while minimizing sudden or excessive strain and providing for smooth operation in the engine power mode. The power arrangement for transmitting power from the engine power output means to the power input assembly, comprises a sprocket, pulley or gear arrangement or suitable combinations thereof. The left and right pedal cranks extending from the ends of said pedal crank shaft are constructed and arranged to engage the pedal crank shaft to impart its movement to the shaft when operating in the pedal mode and to disengage the pedal crank shaft when power is transmitted from the engine to the pedal crank shaft when operating in the engine power mode. On the other side of the pedal crank shaft housing, is located the existing sprocket assembly which is connected via a chain drive to the sprocket assembly carried by the rear wheel hub as provided on a standard ten gear speed bicycle.

BRIEF DESCRIPTION OF THE DRAWINGS

For a fuller understanding of the nature and desired objects of this invention, reference should be had to the following detailed description taken in connection with the accompanying drawing wherein like reference characters refer to corresponding parts throughout the several views and wherein.

DETAILED DESCRIPTION

Figure 6:
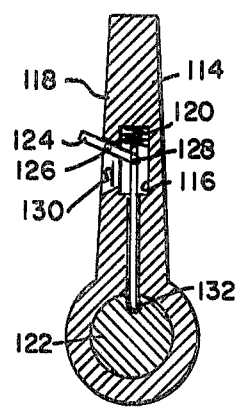
FIG. 6 is a cross sectional view illustrating a modified form of the pedal shaft of FIG. 3.

With reference to the drawings, an engine of the internal combustion type, such as a gasoline engine is generally illustrated at 10. The internal characteristics of the engine which may be of the two or four stroke type are omitted, the only condition being that it should be short enough to be fitted in the space between the front diagonal bar 12 and the rear diagonal bar 14 of bicycle 11 and sufficiently narrow to permit the operator's legs to straddle and pedal when the bicycle is operated in the pedal mode. Additionally, it should preferably be fitted with a transmission shaft 16 and clutch shown generally at 18 each operated from the left. The clutch 18 is illustrated as a centrifugal clutch, the internal characteristics of which are well known and are illustrated generally at 20 and is attached to transmission shaft 16 in the usual manner. The drum housing 22 which is coaxial with transmission shaft 16 carries a sprocket 24 and sprocket bearings 26. At engine idle speeds the centrifugal clutch does not impart motion to drum housing 22, but as the transmission shaft 16 rotates faster at speeds in excess of idle, the clutch mechanism 20 contacts drum 22 and by frictional engagement imparts similar rotary motion to the drum housing. The drum housing 22 which carries the sprocket 24 transmits its motion directly to sprocket 24. In planning the engine, care must be taken that the transmission shaft 16 and associated clutch housing 22 have an overall short lateral extension so that they will not substantially interfere with the legs of the operator or rider.

The engine 10 is held in position by support brace 28 which is attached to front and rear diagonal bars 12 and 14 by clamp plates 30 and bolts 32. Attached to the support braces 28 by braces 34 and bolts 36 is a shaft 38. Mounted on shaft 38 are two sprockets 40 and 42 which are designed to hold chains and which may be formed of an integral structure. The axis of shaft 38 and transmission shaft 16 are preferably aligned in the same vertical plane although this feature is not critical. The sprockets 40 and 42 are of different sizes and will be described hereinafter with respect to the power transmission arrangement and are provided with bearings 44 and 46.

The pedal shaft 48 is mounted in the longitudinal cylindrical portion 50 of the bicycle frame and is provided with bearings 52. Mounted on pedal shaft 48 is a sprocket assembly generally indicated by 54. The sprocket assembly 54 comprises an inner disk 56 and bearings 57 coaxially positioned upon the pedal shaft 48. The disk 56 (FIGS. 1 and 4) is provided with tapered slots 58 in which roller bearing pins 60 lodge either at point a or point b, depending on the relative motion of the pedal shaft 48 and the sprocket assembly 54. Coaxially disposed about the inner disk 56 is an outer sprocket disk 64 and bearings 65. The inner disk and outer sprocket disk are connected by three slip tension means shown generally at 66. The slip tension means comprise a tension spring 68 attached at one end to bracket 70 carried by inner disk 56 and at the other end to bracket 72 carried by outer sprocket disk 64.

Figure 4:
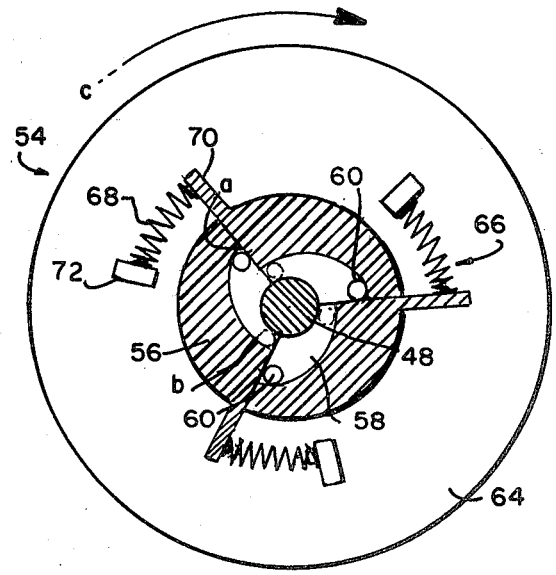
FIG. 4 is an enlarged cross taken along the line 4—4 of FIG. 1 illustrating the sprocket assembly of the present invention.

With particular reference to FIG. 4, when the outer disk sprocket 64 of the sprocket assembly is operated by power transmitted by the engine in a direction corresponding to the forward movement of travel as shown by the arrow c, then the slip tension means 66 are initially extended and then impart movement to the inner disk 56 which then begins to rotate in the same direction with outer sprocket disk 64. The slip tension means 66 provide for smooth acceleration and minimize or reduce stress produced by sudden or excessive strain on the power transmitting arrangement as discussed hereinafter. The movement imparted to the inner disk 56 is in the same direction as the outer sprocket disk 64. In this mode of operation the roller bearing pins 60 move to position b and lock the inner disk 56 with the pedal shaft 48 so that the pedal shaft shares the same forward movement as transmitted by the power arrangement.

The shaft 48 transmits its motion to sprockets 74 and 76 carried by shaft 48. The motion imparted to sprockets 74 and 76 is transmitted to sprocket assembly 78 carried by the hub 80 of the rear wheel by chain 82. The sprockets 74, 76 and assembly 78 are a diagrammatic representation of a variable ten speed gear assembly as is well known including means (not shown) to preselect the gear required.

When it is desired to operate the bicycle in the pedal mode with engine off, the operator imparts forward motion to the pedals 62 and pedal arms 84 which are carried by shaft 48 thereby transmitting movement to shaft 48 in a forward direction as shown by arrow c of FIG. 4. The relative movement of shaft 48 and inner disk 56 cause the roller bearing pins 60 to move to position a of slots 58 whereby the inner disk 56 and sprocket assembly 54 do not share in the forward movement of the shaft 48, the movement being imparted only to sprockets 74 and 76 via shaft 48.

The pedal assembly can best be seen by reference to FIG's. 1 and 3 wherein the assembly comprises a pedal crank shaft 84 and a cam 86, formed in or carried by shaft 48. Disposed in slot 88 of pedal crank shaft 84 is a pin 90, a tension spring 92, set screw 94 and bearings 96. When the pedal crank shaft is moved in the direction as shown by the arrow d by the forward movement of the pedals, the face 98 of cam 86 carried by shaft 48 and pin 90 contact and the pedal arm movement is transmitted to shaft 48, which shares the same forward movement as shown by arrow e and which thereby imparts motion to sprockets 74 and 76 but not to sprocket assembly 54 as discussed above. When the pedals are not being operated and shaft 48 is operated in a forward movement by the transmitted power arrangement (as shown by arrow e) the cam rotation serves to raise pin 90 and thus no motion is imparted to the pedal crank shaft 84. Set screw 94 and tension spin 92 serve to adjust the desired tension on pin 90 in the usual manner.

Figure 1:
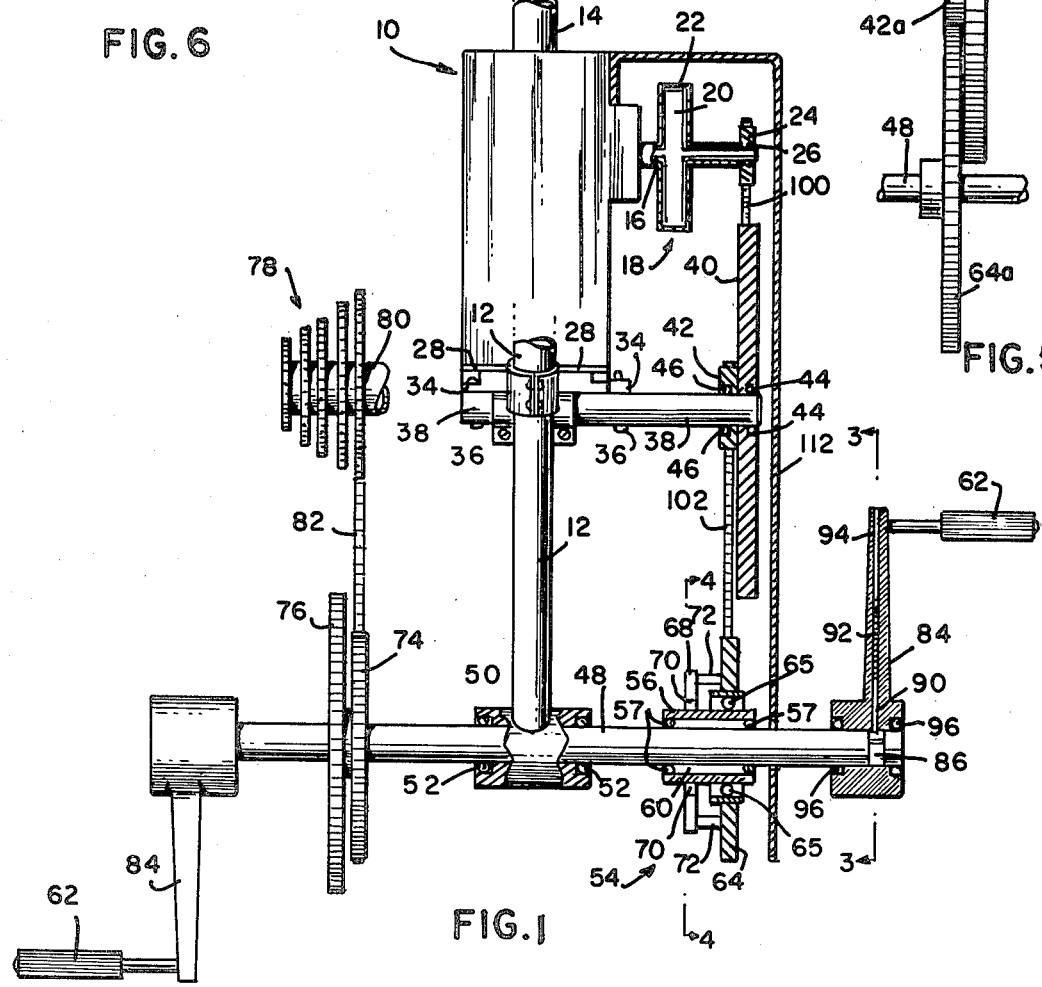
FIG. 1 is a fragmentary plan view partly in section of the installation of the attachment of the invention for moterizing a bicycle.

The engine power transmitting arrangement as best seen in FIG. 1 comprises sprocket 24 which is carried by housing 22 described hereinbefore. Sprocket 24 transmits its motion through chain 100 to sprockets 40 and 42 to which it is attached or formed of an integral structure. Sprocket 42 transmits its motion through chain 102 to sprocket 64 and associated sprocket assembly 54 in the manner previously described above to impart motion via shaft 48 sprockets 74 and 76 and via chain 82 to sprocket assembly 78.

In one preferred embodiment sprocket 24 has a diameter of 1.5 inches, sprocket 40 has a diameter of 10 inches, sprocket 42 a diameter of 2 inches and sprocket 64 a diameter of 6 inches to provide suitable gear ratios.

Figure 2:
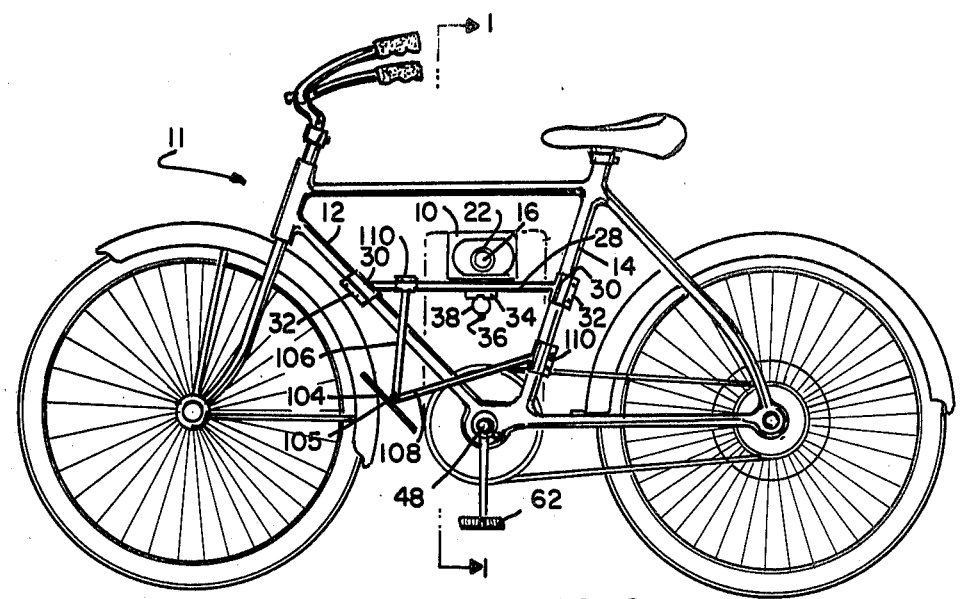
FIG. 2 is a fragmentary side elevation of a bicycle and showing the manner of attachment of the invention as taken substantially on the line 2—2 of FIG. 1 with the protective cover illustrated by a dotted line.
Figure 3:
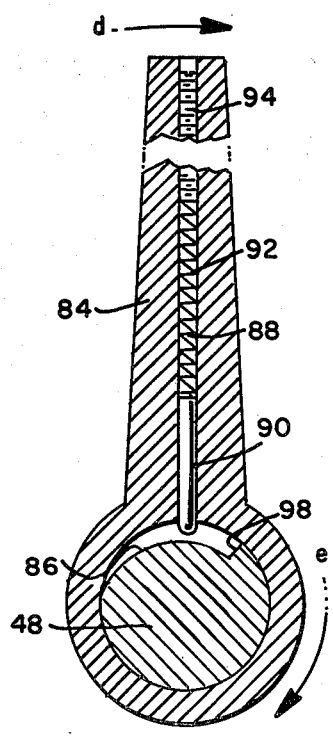
FIG. 3 is an enlarged cross-section taken along the line 3—3 of FIG. 1 illustrating the pedal shaft of the present invention.

Also in a preferred embodiment foot rests are provided for use when operating on engine power. The foot rests comprise a support member 104 (see FIG. 2) held in position by braces 106 and 108 suitably clamped in position in the manner illustrated by clamps 110.

The foot rest 104 is also provided with a hinge mount 105 to permit the foot rest to be folded against the braces 106 and 108 when not in use. Additionally, when the foot rests are in the down position as when operating on engine power, the pedals 62 may be supported by the foot rest.

Additionally, a protective cover 112 (shown in FIG. 2 by dotted lines) is preferably provided to cover the power transmission assembly.

Referring now to FIG. 6 there is illustrated a modified pedal crank comprising the pedal crank shaft 114 and slot 116, positioned with slot 116 is a pin 118, and spring 120 attached thereto. Lever 124 is pivotally attached to pin 118 at 126 and pivotally attached to shaft 114 at 126. When operating in the pedal mode the lever is released from latch means 128 and moved upward to move pin 118 into register with opening 132 in shaft 122 (which corresponds to shaft 48) to thereby lock crank shaft into position for pedal operation. When pin 118 is in up position, the engine power can be used without engaging the crank shaft 114.

Figure 5:
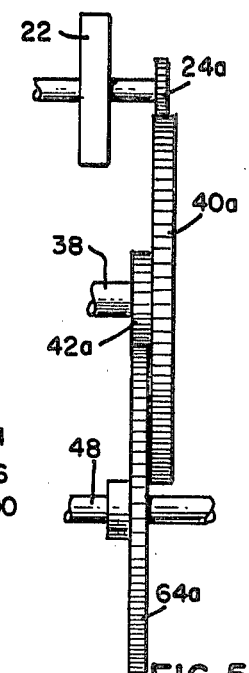
FIG. 5 is a diagrammatic view showing a modified form of the drive mechanism in accordance with the present invention.

While the invention has been described with respect to preferred embodiments, it is to be understood that certain modification may be made without departing from the scope of the invention involved. For example, in one embodiment pulleys (not shown) designed to take belts may be employed in place of sprockets 24 and 40. In another embodiment, reference being made to FIG's. 1 and 5, the power transmission arrangement may comprise gears 24a, 40a 42a and 64a, which engage each other in the manner clearly shown in FIG. 5 and are related in function respectively to sprockets 24, 40, 42 and 64 of FIG. 1. Additionally, the engine 10 may be constructed and arranged to contain within its housing clutch 22 and gears 40 and 42. Also while the motor unit attachment has been described with respect to an internal combustion engine, it is to be understood that motors having a mechanical power output, such as an electric motor, may be suitably employed.

What is claimed is:

1. In a motorized bicycle having a pedal crank shaft housing, a pedal crank shaft journaled in said housing and pedal cranks extending from said pedal crank shaft, the improvement comprising a pedal crank shaft engagement assembly comprising a cam surface disposed on the pedal crank shaft adjacent the ends of said pedal cranks, a slot disposed in said pedal cranks, a movable pin disposed in said slot, and means disposed in said slot for moving said pin into contact with said cam surface, said cam surface having a portion of its surface arranged to engage said pin during operation of said pedal cranks whereby said pedal cranks transmit movement to said pedal crank shaft.

2. In a motorized bicycle having a pedal crank shaft housing, a pedal crank shaft journaled in said housing and pedal cranks extending from said pedal crank shaft, the improvement comprising a pedal crank shaft engagement assembly comprising a slot disposed in said pedal cranks adjacent said pedal crank shaft, a movable pin disposed in said slot, a corresponding slot disposed in said pedal crank shaft for reception of said pin and means for moving said pin into engagement with said slot on said pedal crank shaft whereby said pedal cranks transmit movement to said pedal crank shaft.

3. In combination with a bicycle having a pedal crank shaft housing, a pedal crank shaft journaled in said housing, a frame having a front diagonal bar, an upwardly extending bar forming a seat support, a rearwardly extending fork, a forwardly extending fork, a wheel carried by said forward fork, a rear wheel carried by said rear fork and a sprocket assembly on the rear wheel, a motor unit attached to said bicycle frame, power input means for transmitting power output from said motor to said pedal crank shaft, a sprocket assembly mounted on said pedal crank shaft, a chain connecting said sprocket assembly with said rear wheel sprocket assembly, and pedal cranks extending from said pedal crank shaft, the improvement comprising means for engaging said pedal cranks to impart movement to said pedal crank shaft and to disengage said pedal crank when power is transmitted from said motor to said pedal crank shaft and comprising a cam surface disposed on the pedal crank shaft adjacent the ends of said pedal cranks, a slot disposed in said pedal cranks, a movable pin disposed in said slot, a tension spring disposed in said slot for urging said pin into engagement with said cam surface, said cam surface having a portion of its surface arranged to engage said pin during operation of said pedal cranks whereby said pedal cranks transmit movement to said pedal crank shaft.

4. The combination of claim 3 further comprising brace means for securing said motor to said frame extending between said front diagonal bar and said upwardly extending bar.

5. The combination of claim 4 further comprising foot rests hingedly attached to said brace means.

* * * * *